Figure 6:
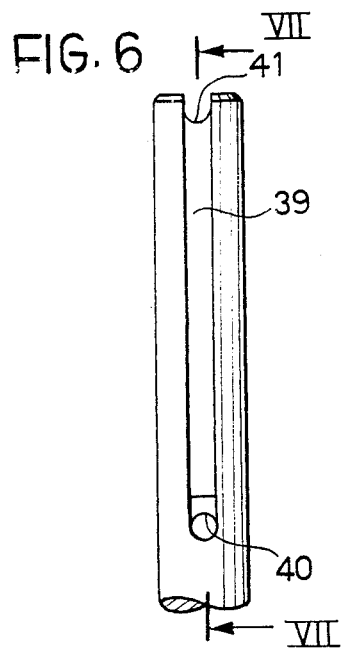

United States Patent [19]

Martinengo

[11] Patent Number: 4,945,789

[45] Date of Patent: Aug. 7, 1990

[54] DEVICE FOR SCREWING A SELF-TAPPING MEMBER INTO A SMOOTH HOLE PROVIDED IN A STRUCTURE INTENDED TO HOUSE THE MEMBER

[75] Inventor: Adriano Martinengo, Pianezza, Italy

[73] Assignee: Fiat Auto S.p.A., Turin, Italy

[21] Appl. No.: 430,454

[22] Filed: Nov. 2, 1989

[30] Foreign Application Priority Data

Nov. 7, 1988 [IT] Italy .................................. 67988 A/88

[51] Int. Cl.⁵ ............................................. B25B 21/00
[52] U.S. Cl. ....................................... 81/55; 81/57.36; 81/125
[58] Field of Search ............... 81/54, 55, 57.22, 57.36, 81/125

[56] References Cited

U.S. PATENT DOCUMENTS

| 4,048,875 | 9/1977 | Heinen et al. | 81/55 X |
| 4,630,510 | 12/1986 | Belanger | 81/55 |

Primary Examiner—James G. Smith
Attorney, Agent, or Firm—Sughrue, Mion, Zinn, Macpeak & Seas

[57] ABSTRACT

A device for screwing a self-tapping member into a smooth hole provided in a structure which is intended to house the member comprises a tubular body for connection to the motor-driven shaft of a screwdriver and a cylindrical element which is situated within the tubular body, projects from the end face of the latter and is articulated to the tubular body about two mutually-perpendicular axes perpendicular to the longitudinal axis of the body itself.

8 Claims, 3 Drawing Sheets

FIG. 1
FIG. 2
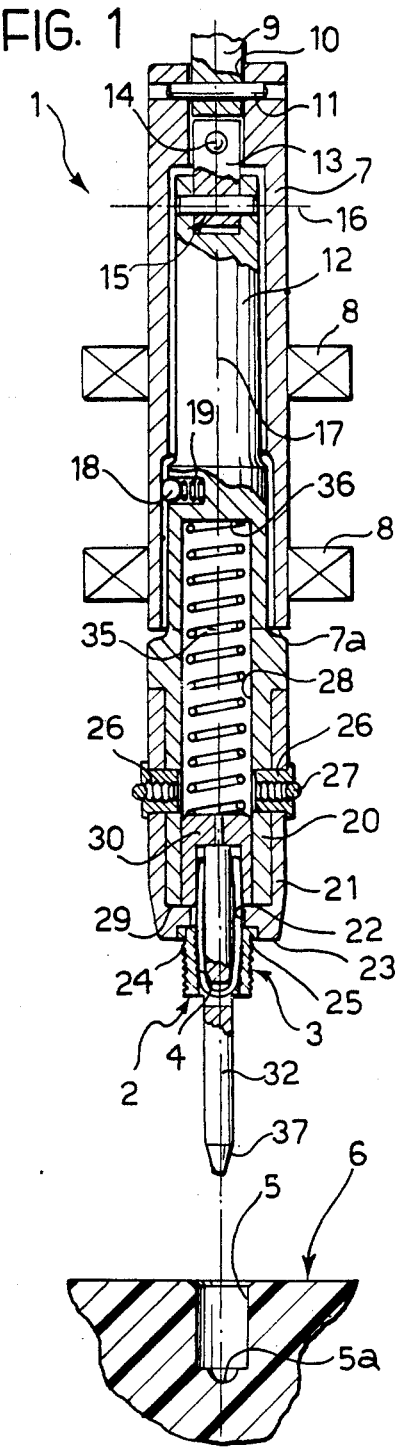
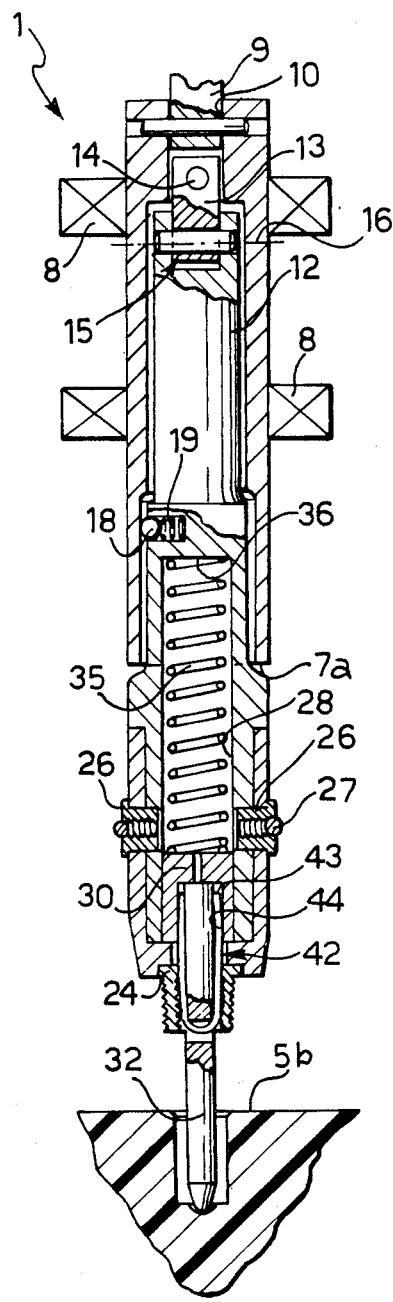

FIG. 3
FIG. 5
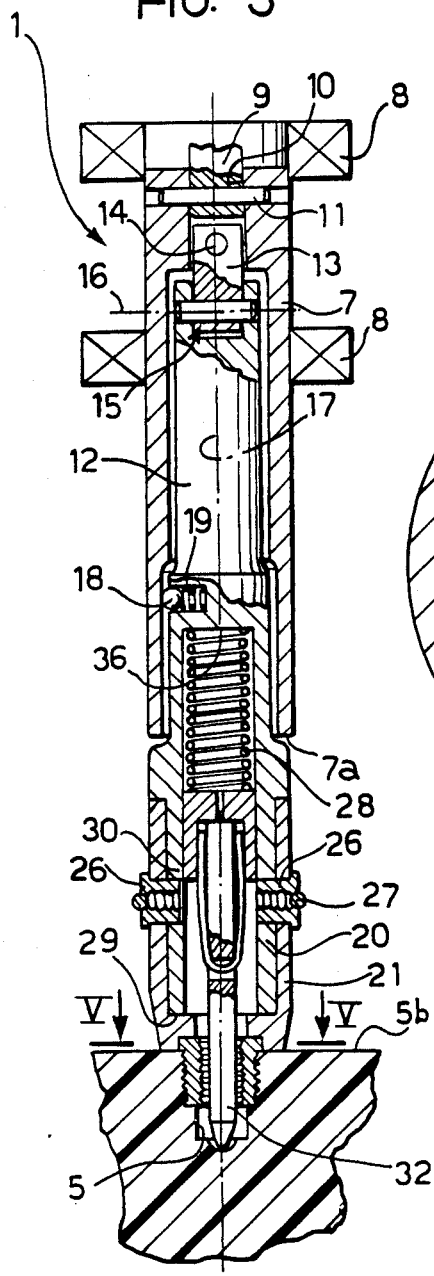
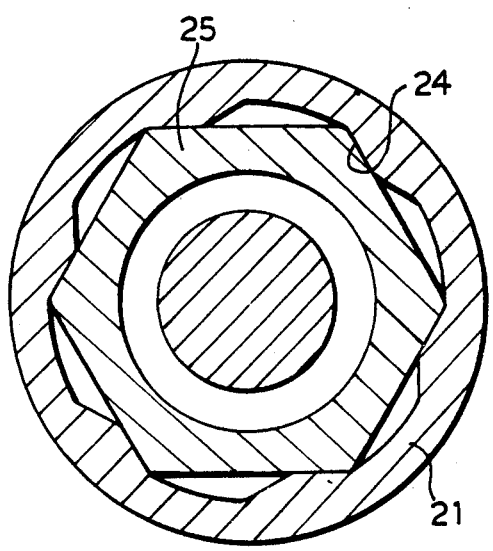

DEVICE FOR SCREWING A SELF-TAPPING MEMBER INTO A SMOOTH HOLE PROVIDED IN A STRUCTURE INTENDED TO HOUSE THE MEMBER

The present invention relates to a device for screwing a self-tapping member with an internal bore into a smooth hole provided in a structure which is intended to house the member.

A typical application of the present invention is that of the insertion of metal inserts into plastics parts of motor vehicles (for example, the framework of a rear hatch of a motor vehicle) in order to enable metal elements (for example, the various auxiliary elements of the hatch, such as the hinges, the electric motor for operating the windscreen-wiper, etc.) to be fixed to these parts.

Various problems are encountered when the self-tapping inserts are to be inserted automatically into the plastics parts. First of all, the inserts must be screwed in without the risk of damage. Secondly, the fact that, due to manufacturing tolerances, the screwing device may be slightly out of alignment with the smooth holes in the structure is intended to house the inserts must be taken into account. Moreover, the insert must be held securely on the screwing device until it is inserted in the plastics structure and at the same time it must be ensured that the insert does not remain attached to the screwdriver, in the event of misscrewing, when the table carrying the various screwing devices (in fact, it is usually necessary to fit a plurality of inserts simultaneously) returns to its raised position.

The object of the present invention is to produce a screwing device which enables all the above problems to be avoided and which at the same time has a simple and reliable structure.

In order to achieve this object, the device according to the invention is characterised in that it comprises:

a tubular body for connection to the motor-driven shaft of a screwdriver, a cylinder element which is situated within the tubular body, projects from the end face of the latter and is articulated to the tubular body about two mutually-perpendicular axes perpendicular to the longitudinal axis of the body itself, the cylindrical element having a polygonal recess in its end face for receiving a hexagonal head of the self-tapping member, a frontal pin which extends parallel to the longitudinal axis of the cylindrical element from the end face thereof and is slidable within a cavity of the cylindrical element, resilient retaining means carried by the pin for keeping a self-tapping member fitted on the pin with its head engaged in the recess, the pin having a point for centring and engaging the bottom of the smooth hole as a result of the lowering of the screwing device over the hole, so as to cause an inclination of the cylindrical element about its axes of articulation to the tubular body if the axis of the latter does not exactly coincide with the axis of the smooth hole, the resilient retaining means being adapted to enable the release of the self-tapping member from the frontal pin when, the point of the pin having contacted the bottom of the smooth hole, the device is lowered and then rotated to insert the self-tapping member into the smooth hole.

Figure 4:
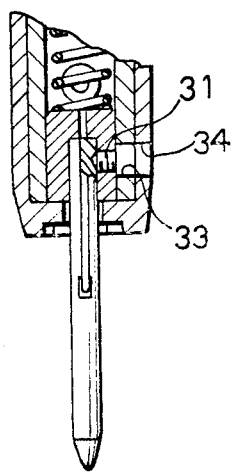
Figure 7:
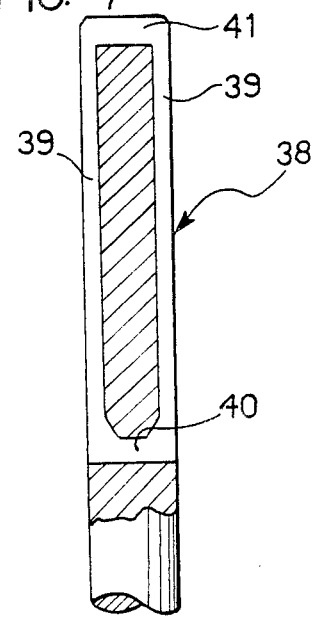

The invention will now be described with reference to the appended drawings, provided purely by way of non-limiting example, in which:

FIG. 1 is a longitudinal sectional view of a device according to the invention in a first operating condition, FIGS. 2 and 3 show the device of FIG. 1 in two different operating conditions, FIG. 4 shows a detail of the device of FIG. 1, sectioned in a plane perpendicular to the plane of FIG. 1, FIG. 5 is a section taken on the line V—V of FIG 3, on an enlarged scale, FIG. 6 is a view of a detail of the device of FIG. 1, on an enlarged scale, and FIG. 7 is a section taken on the line VII—VII of FIG. 6.

In the drawings, a device, indicated 1, is usable for screwing a metal insert 2 with an external tapping thread 3 and an internal threaded hole 4 into a smooth hole 5 provided in a structure 6 of plastics material. In practice, a plurality of devices of the type illustrated in FIG. 1 are usually provided and are carried by a vertically-movable table (not illustrated) which enables the device 1 to be moved towards and away from the plastics body 6. Each screwing device has a tubular body 7 connected for rotation with the motor-driven shaft of a screwdriver. The structure of the screwdriver is not illustrated in the appended drawings, since it is of known type and does not fall within the scope of the present invention. Conventionally, the screwdriver can rotate the tubular body 7, which is supported for rotation by two rolling bearings 8 (shown schematically in the drawings), and cause the axial movement of the tubular body 7 relative to the bearings 8.

The tubular body 7 is connected for rotation with the screwdriver by means of a square-sectioned shank 9 which is engaged in a hole 10 of corresponding cross-section in the tubular body 7 and is also connected to the latter by means of a transverse pin 11.

A cylindrical element 12 is situated within the tubular body 7 and projects from the end face 7a of the tubular body 7. The cylindrical element 12 is connected for rotation with the tubular body 7 by means of a shank 13 which is connected to the tubular body 7 by means of a transverse pin 14 and to the cylindrical element 12 by means of a transverse pin 15. By virtue of the clearance between the tubular body 7 and the cylindrical element 12, the latter can pivot slightly relative to the tubular body 7 about its axes 16 and 14 which are perpendicular to each other and perpendicular to the axis 17 of the device. The cylindrical element 12 is provided with three equiangularly-spaced balls 18 (only one of which is visible in the drawings) biassed by respective springs 19 against the inner surface of the tubular body 7 so as always to return the cylindrical element 12 to the central position of alignment with the tubular body 7 after operation.

The part of the cylindrical element 12 which projects from the tubular body 7 has a cylindrical end portion 20 onto which is fitted a cap-shaped body 21 whose base has a through-hole 22. A quick-fit recess 24 of polygonal cross-section (see also FIG. 5) is formed in the end face 23 of the cap-shaped body 21 for receiving a hexagonal head 25 which forms part of the metal insert 2.

The cap-shaped body 21 is held on the end portion 20 of the cylindrical element 12 by means of two diametrally-opposed transverse pins 26 which engage aligned holes formed in the end part 20 and in the skirt of the cap-shaped body 21. The two transverse pins 26 are held in position by a resilient split ring 27 with superposed ends. Each of the pins 26 has an internal threaded hole into which a threaded member for facilitating the removal of the pin from its seat can be screwed.

The end part 20 of the cylindrical element 12 has a coaxial cylindrical cavity 28 which extends from the end face 29 of the end part 20. A block 30 is mounted for sliding within the cavity 28 and the upper end of a pin 32 which projects from the end face of the cap-shaped body 21 through the hole 22 is fixed thereto by means of a grub screw 31. The end part 20 and the cap-shaped body 21 have holes 33, 34 which afford access for a tool for operating the grub screw 31. It should be noted that, in the condition shown in FIG. 1, the pin 32 projects beyond the insert 2 by a distance which exceeds the sum of the depth of the smooth hole 5 and the height of the insert 2 of the smooth hole 5 by 2 mm.

The block 30 is biassed towards a lowered position, in which it is in contact with the base surface of the body 21 with a skirt, by a helical spring 35 interposed between the block 30 and the end 36 of the cavity 28. As can be seen in the drawings, the end of the pin 32 has a conical point 37 for facilitating its insertion in the hole if the latter is excessively offset relative to the pin.

With reference to FIGS. 6 and 7, the upper part of the pin 32 has a groove 38 including two axial sections 39 which extend along two diametrally-opposed generatrices of the pin and two transverse sections 40 and 41 which pass through the pin at right angles to its axis and interconnect the ends of the axial sections 39. The groove houses a U-shaped resilient element 42 the central part of which is engaged in the section 40 of the groove and the two arms of which are engaged in the axial sections 39 of the groove. The ends of the arms of the U-shaped element 42 are inserted in an annular cavity 43 defined between the pin 32 and the wall 44 of an axial cavity formed in the block 30. Under these conditions, the two arms of the U-shaped element 42 tend to project beyond the line of the pin 32 so that the resilient element retains the metal insert 2 by interference after it has been fitted over the pin 32 and the two arms of the U-shaped element 42.

The operation of the device described above is as follows:

At the start of its operation, the device is situated in the raised position shown in FIG. 1, with the metal insert 2 fitted on the pin 32 and held thereon in the manner described above. As already mentioned, in practice, a single vertically-movable table is provided and carries a plurality of screwdrivers, each of which has a device of the type illustrated in FIG. 1. In this condition, each device 1 is substantially aligned with the axis of the smooth hole 5 associated therewith. Naturally, in this condition, the motors of the various screwing devices are not yet activated.

The screwdriver-carrying table is lowered from the position shown in FIG. 1, until the point 37 of the pin 32 of each device contacts the bottom of the smooth hole associated therewith. The hole is formed beforehand by means of a moulding operation and therefore has a recessed central part 5a in its bottom. By virtue of its conical shape, the point 37 is able to engage the recessed part 5a even when the axis 17 of the device is not exactly aligned with the axis of the hole. In this case, the point 32 acts as a guide for the cylindrical element 12 of the device, which is therefore inclined to the tubular body 7 about its axes of articulation 16 and 14. Since the articulation axes 14 and 16 are situated adjacent the opposite end of the device from the point 37, the small inclinations permitted by the clearance between the tubular element 12 and the tubular body 7 permit relatively large misalignments between the point 37 and the axis of the screwdriver. In one embodiment produced by the Applicant, the device can centre itself in the manner indicated above, whilst permitting an error of four millimetres over 360°.

Once the device has reached the position shown in FIG. 2, any further lowering of the pin 32 and the resilient U-shaped element 42 carried thereon is prevented. When this position is reached, the screwdriver-carrying table continues to descend until the end surface of the metal insert 2 contacts the upper surface 5b of the plastics body 6. From this point onwards, the lowering of the metal insert 2 into the hole 5 can only be achieved by the simultaneous rotation of the insert 2 so as to cause the tapping of the hole 5. At this point, however, the screwdriver is not yet rotated but is lowered further. This lowering is possible, in spite of the fact that the device 1 cannot descend further in the above condition, because the screwdriver is provided, in known manner, with an internal spring (not illustrated) which enables the screwdriver to slide axially relative to the screwing device 1. The lowering of the screwdriver continues for a short distance until a certain loading of the aforementioned spring has been achieved. Thus, even before the screwdriver starts to rotate, the insert 2 is pressed against the surface 5b of the plastics body 6 by a force which corresponds to the loading of the spring.

Once the above-described condition has been reached, the screwdriver-carrying table is stopped and the rotation of the screwdriver is started. This rotation causes a corresponding rotation of the tubular body 7 which is transmitted to the cylindrical element 12 by means of the pins 14 and 15 and thence to the metal insert 2 by the engagement of the hexagonal head 25 in the quick-fit polygonal recess 24. Naturally, at this stage, the downward movement of the device 1 is caused by the expansion of the previously-loaded spring in the screwdriver. The insert 2 thus taps the smooth hole 5 until the condition shown in FIG. 3 is reached. In this condition, the insert 2 is released from the reslient U-shaped element 42 so that, once the screwdriver stops rotating, the screwdriver-carrying table can be raised and each insert 2 can be released simultaneously and automatically from its pin 32.

If automatic equipment is used for fitting the insert 2 onto the pin 32 before the screwing operation, the head 25 may not be engaged correctly in the recess 24 in the end face of the device. In this event, however, the nut 2 remains anchored to the pin by means of the resilient U-shaped element 42 and the head of the insert is engaged correctly in the recess immediately the screwdriver starts to rotate after the insert has been placed against the upper surface 5b of the plastics body 6.

Naturally, the principle of the invention remaining the same, the forms of embodiment and details of construction may be varied widely with respect to those described and illustrated purely by way of example.

I claim:

1. A device for screwing a self-tapping member (2) with an internal bore into a smooth hole (5) provided in a structure (6) which is intended to house the member (2), said device comprising:

a tubular body (7) for connection to a motor-driven shaft of a screwdriver, a cylindrical element (12) which is situated within the tubular body (7), projects from an end face (7a) of the latter and is articulated to the tubular body (7) about two axes (16, 14) perpendicular to the longitudinal axis (17) of the body itself, the cylindrical element (12) having a polygonal recess (24) in its end face for receiving a correspondingly-shaped head (25) of the self-tapping member (2), a frontal pin (32) which extends parallel to the longitudinal axis (17) of the cylindrical element (12) from an end face thereof and is slidable within a cavity (28) of the cylindrical element (12), resilient retaining means (42) carried by the pin (32) for keeping a self-tapping member (2) fitted on the pin (32) with its head (25) engaged in the recess (24), the pin having a point (37) for centring and engaging the bottom (5a) of the smooth hole (5) as a result of the lowering of the screwing device (1) over the hole (5), so as to cause an inclination of the cylindrical element (12) about its axes (16, 14) of articulation to the tubular body (7) if the axis (17) of the latter does not exactly coincide with the axis of the smooth hole (5), the resilient retaining means (42) being adapted to enable the release of the self-tapping member (2) from the frontal pin (32) when, the point (37) of the pin (32) having contacted the bottom (5a) of the smooth hole (5), the device (1) is lowered and then rotated to insert the self-tapping member (2) into the smooth hole (5).

2. A device according to claim 1, wherein
means (18, 19) are interposed between the cylindrical element (12) and the tubular body (7) for biassing the cylindrical element (12) towards its central position of alignment with the tubular body (7).

3. A device according to claim 1, wherein
the resilient retaining means comprise a U-shaped resilient element (42) the central part of which is engaged through a transverse passage (40) of the frontal pin (32) and the arms of which are situated in two axial grooves (39) formed in the pin (32) with the ends of the arms fixed to the pin, whereby the self-tapping member (2) can be retained on the pin (32) and the two arms by interference.

4. A device according to claim 3, wherein
the upper end of the frontal pin (32) is fixed to a block (30) mounted for sliding in the cavity (28) of the tubular element (12), the block (30) being biassed towards the lower travel limit position by resilient means (35) arranged within the cavity (28), the ends of the two arms of the U-shaped resilient element (42) being inserted in an annular cavity (43) defined between the pin (32) and the wall of an axial cavity (44) formed in the block (30).

5. A device according to claim 4, wherein the lower travel limit position of the block (30) is defined by the base wall of a cap-shaped body (21) fitted onto a cylindrical end part (20) of the cylindrical element (12).

6. A device according to claim 5, wherein
the pin (32) is fixed to the block (30) by means of a transverse grub screw (31) which is accessible through holes (33, 34) provided in the end part (20) of the tubular element and in the skirt of the cap-shaped body (21).

7. A device according to claim 5, wherein
the cap-shaped body (21) is fixed to the end part (20) of the cylindrical element (12) by means of two diametrically-opposed transverse pins (26) which engage corresponding holes formed in the end part (20) and in the skirt of the cap-shaped body (21), the transverse pins (26) being held in position by a resilient ring (27).

8. A device according to claim 7, wherein
each of the transverse pins has an internal threaded hole into which a gripping member for facilitating the removal of each pin from its seat can be screwed.

* * * * *